W. H. THIEMER.
UNIVERSAL JOINT.
APPLICATION FILED JUNE 23, 1919.

1,381,600.

Patented June 14, 1921.

Inventor
William H. Thiemer,
By Hull, Smith, Brock & West
Attys.

UNITED STATES PATENT OFFICE.

WILLIAM H. THIEMER, OF CLEVELAND, OHIO, ASSIGNOR TO THE PETERS MACHINE AND MANUFACTURING COMPANY, OF CLEVELAND, OHIO, A CORPORATION OF OHIO.

UNIVERSAL JOINT.

1,381,600.

Specification of Letters Patent.

Patented June 14, 1921.

Application filed June 23, 1919. Serial No. 306,080.

*To all whom it may concern:*

Be it known that I, WILLIAM H. THIEMER, a citizen of the United States, residing at Cleveland, in the county of Cuyahoga and State of Ohio, have invented a certain new and useful Improvement in Universal Joints, of which the following is a full, clear, and exact description, reference being had to the accompanying drawings.

This invention relates to universal joints, and more particularly to joints of the ring-and-yoke type. The general object of the invention is to provide a joint of this character which is simple of construction and which may be conveniently assembled and disassembled, and which is provided with means for efficiently lubricating the journals for the trunnions.

Figure 1:
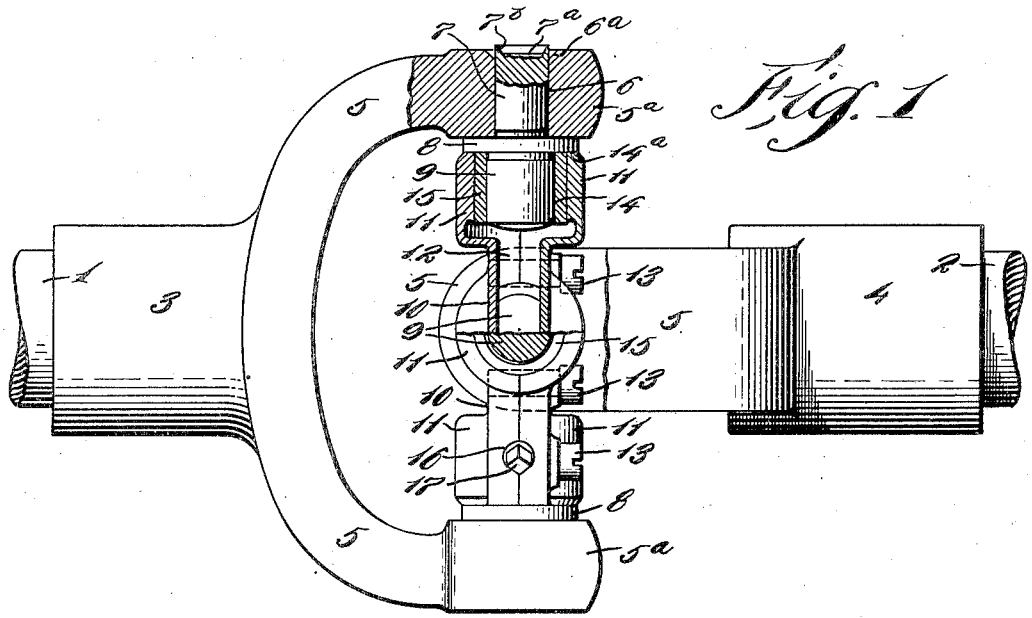
Figure 2:
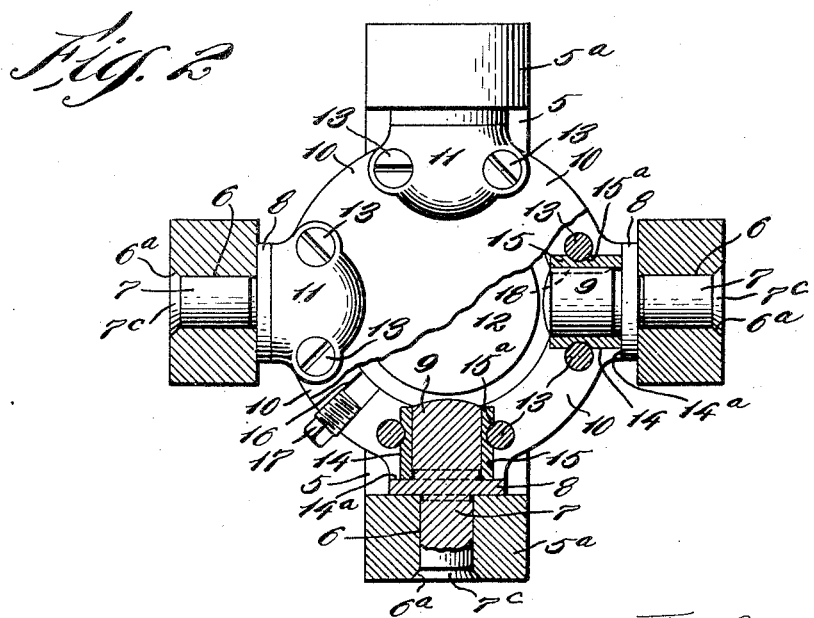

In the drawings forming part hereof, Figure 1 represents a sectional side elevation of a joint of this character, together with the coöperating portions of the shaft sections connected thereby; and Fig. 2 is a view, partly in elevation and partly in section, of the joint proper.

Describing by reference characters the various parts illustrated herein, 1 and 2 denote a pair of shaft sections having the hubs 3 and 4 respectively, each hub carrying a yoke 5, the arms whereof are provided each near its outer end with a bore 6. Mounted in each bore 6 is a stud or pin 7 carrying a trunnion. The outer end of each bore is provided with a flaring or frusto-conical recess 6$^a$ into which the outer end of the stud or pin 7 is adapted to be upset to form a type of rivet connection between said stud or pin and its yoke arm. For this purpose, the outer end of each stud or pin is provided with a frusto-conical recess 7$^a$, leaving a beveled marginal wall 7$^b$ which may be forced outwardly by suitable mechanism to provide an annular head 7$^c$ (see Fig. 2) whereby the pin or stud 7 is secured in place within the groove 6$^a$, providing a flush-rivet connection between the outer end of such pin or stud and the outer surface of its arm. Each stud or pin is provided with a shoulder 8 adapted to bear against the inner surface of the arm 5$^a$ and with a trunnion 9 extending inwardly from said shoulder.

Coöperating with the trunnion 9 is a connecting member having a central chamber for lubricant and journals for said trunnions. This connecting member is of the ring type and is made of two symmetrical sections adapted to be connected to provide a complete connecting member. The ring, when assembled, comprises four outer sections 10 which are relatively between the journals, being expanded at 11 to provide journals for the trunnions. The central portion of the complete ring is of the width or depth of the portions 11, to provide a large central well 12 for lubricant. Each of the sections is provided with four half-journal bearings and with half of the central lubricant well, whereby, when the sections are united, as by means of bolts 13, a connecting member having complete journal bearings and a complete well will be formed. Bolts 13 are preferably so arranged as to intersect slightly the journal bores 14 and to extend through grooves 15$^a$ provided in the bushings 15 thereby to anchor said bushings in place.

Intermediate a pair of journals, the ring sections are jointly provided with a filling opening 16 extending into the chamber 12, said opening being provided with a removable plug 17. Lubricant from this central chamber will be supplied by centrifugal action to the interior of each bushing, as by means of a port 18 provided in the outer surface of each trunnion and within its bushing, the inner end of such port communicating with the chamber 12. The shoulder 8 is adapted to abut firmly at one side against the outer end of the bushing and at its opposite side against the outer end 14$^a$ of the journal, thereby to prevent the leakage of lubricant at this point.

In assembling, the bushings will be applied to their respective trunnions, with the grooves 15$^a$ in proper position to receive the bolts 13. The two sections of the ring will then be applied to opposite sides of the bushings and trunnions and will be connected by means of the bolts 13. Lubricant having been inserted into the chamber 12 will be distributed by centrifugal action through the ports 18 to the bearings provided between the inner surfaces of the bushings and the outer surfaces of the trunnions.

Having thus described my invention, what I claim is:—

1. In a universal joint, the combination of a pair of yokes, the arms whereof are provided each with a bore, a trunnion having a pin or stud mounted in each bore, the outer end of each pin being recessed and pressed outwardly to form a flush rivet connection with its arm, and a connecting member having journals adapted to receive said trunnions.

2. In a universal joint, the combination of a pair of yokes each having arms provided each with a bore, the outer end of each bore being provided with a recess, a trunnion having a stud or pin mounted in each bore and provided with an annular rim pressed into the recess thereof to provide a rivet connection with such arm, and a connecting member having journals for said trunnions.

3. In a universal joint, the combination of a pair of yokes each having arms provided each with a bore, a trunnion having a pin or stud mounted in each bore and a shoulder adapted to bear against the inner surface of such arm, a two-part connecting member having journals for said trunnions, the outer surface of each journal being engaged by a shoulder, a bushing in each journal surrounding the trunnion therein and adapted to engage a shoulder, and means for supplying lubricant from said connecting member to said journals.

4. In a universal joint, the combination of a pair of yokes each having arms provided each with a bore, a trunnion having a pin or stud mounted in each bore and a shoulder adapted to bear against the inner surface of such arm, a connecting member having journals for said trunnions, a bushing in each journal surrounding the trunnion therein, and means for supplying lubricant from said connecting member to said journals.

5. In a universal joint, the combination of a pair of yokes each having a pair of arms provided each with a bore, a trunnion having a pin or stud mounted in each bore, a two-part connecting ring having a central chamber for lubricant and provided with journals extending outwardly from said chamber adapted to receive said trunnions, and means for supplying lubricant from said chamber to said journals.

6. In a universal joint, the combination of a pair of yokes each having a pair of arms provided each with a bore, a trunnion having a pin or stud mounted in each bore, a two-part connecting ring having a central chamber for lubricant and journals for the reception of said trunnions, a bushing in each journal surrounding the trunnion therein and provided with a groove in the outer surface thereof, and means for connecting the two parts of said connecting member and adapted to extend through the grooves in said bushings.

7. In a universal joint, the combination of a pair of yokes each having a pair of arms provided each with a bore, a trunnion having a pin or stud mounted in each bore, a two-part connecting ring having a central chamber for lubricant and journals for said trunnions, a bushing in each journal surrounding the trunnion therein and provided with grooves on opposite sides thereof extending inwardly from its outer surface, bolts connecting the sections of said ring and adapted to extend through the grooves in said bushings, each trunnion being provided with a port in the external surface thereof communicating at its inner end with the lubricant chamber and adapted to conduct lubricant therefrom to the inner surface of its surrounding bushing.

In testimony whereof, I hereunto affix my signature.

WILLIAM H. THIEMER.